(12) United States Patent
Furuichi et al.

(10) Patent No.: US 7,010,405 B2
(45) Date of Patent: Mar. 7, 2006

(54) SYSTEM AND METHOD OF CONTROLLING AUTOMATIC TRANSMISSION

(75) Inventors: Yoichi Furuichi, Aichi (JP); Yuki Ono, Aichi (JP); Masahiro Hamano, Aichi (JP); Yuichi Imamura, Aichi (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/774,585

(22) Filed: Feb. 10, 2004

(65) Prior Publication Data

US 2004/0158382 A1 Aug. 12, 2004

(30) Foreign Application Priority Data

Feb. 10, 2003 (JP) ............................. 2003-032810

(51) Int. Cl.
*G06F 17/00* (2006.01)
*G06F 19/00* (2006.01)

(52) U.S. Cl. ...................... 701/51; 701/58; 701/67; 701/68; 475/118; 475/120; 475/125; 475/127; 477/80; 477/127

(58) Field of Classification Search ................ 701/56, 701/67, 68, 58, 51; 475/118, 120, 125, 127; 477/62, 79, 80, 86, 127, 159, 161, 162
See application file for complete search history.

(56) References Cited

U.S. PATENT DOCUMENTS 5,115,695 A * 5/1992 Wakahara et al. .......... 477/161

FOREIGN PATENT DOCUMENTS

| JP | 8-93905 A | 4/1996 |
| JP | 8-145157 A | 6/1996 |

* cited by examiner

*Primary Examiner*—Thomas G. Black
*Assistant Examiner*—Brian J. Broadhead
(74) *Attorney, Agent, or Firm*—Foley & Lardner LLP

(57) ABSTRACT

A shift control system for an automatic transmission wherein shifting from a first gear ratio to a second gear ratio is carried out by releasing the hydraulic pressure of a first friction engaging element for disengagement thereof and supplying the hydraulic pressure to a second friction engaging element for engagement thereof, the hydraulic pressure to the second friction engaging element being subjected to feedback control, wherein the shift control system includes a sensor for sensing a parameter on a vehicle cruising condition; and an ECU having a part for calculating, in accordance with the sensed parameter, a difference in output-side rotational speed of the fluid coupling before and after the shifting; and a part for setting, when the shifting is carried out with an output of the engine being smaller than a predetermined value, the second hydraulic pressure in accordance with the calculated difference immediately before start of the feedback control.

12 Claims, 10 Drawing Sheets

RELATED ART
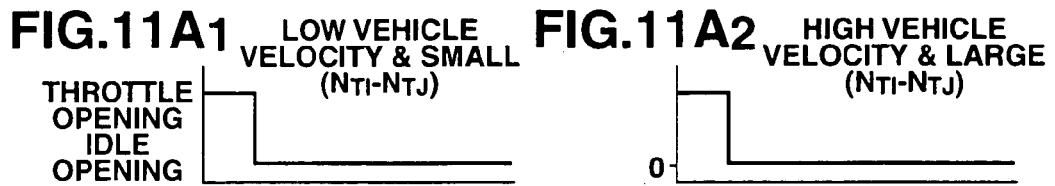
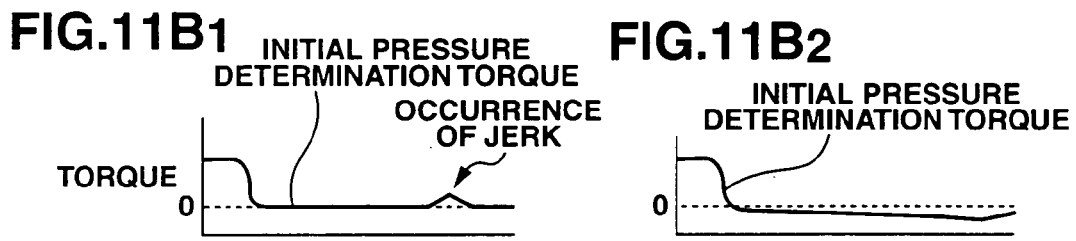
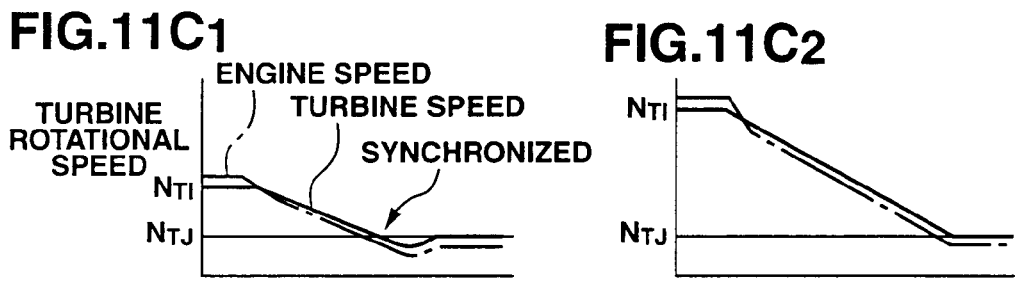
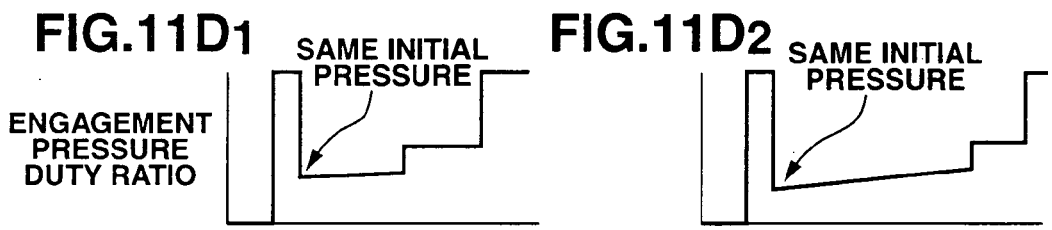
PRESENT INVENTION
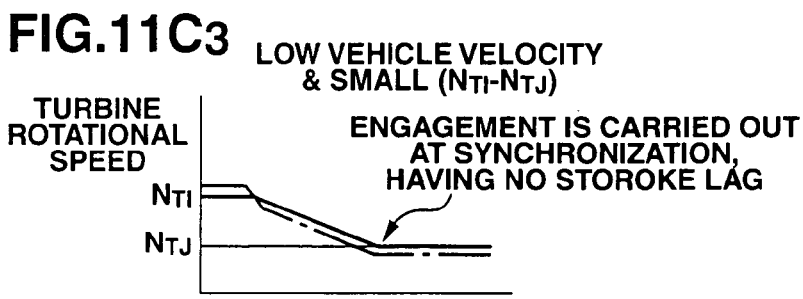
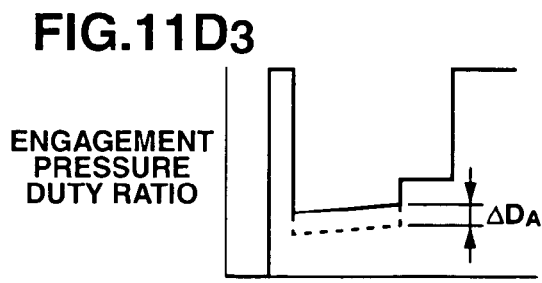

SYSTEM AND METHOD OF CONTROLLING AUTOMATIC TRANSMISSION

BACKGROUND OF THE INVENTION

The present invention relates to a shift control system for an automatic transmission for motor vehicles, and more particularly, to hydraulic-pressure control of an engagement-side friction engaging element.

The automatic transmission comprises generally a shift mechanism including a planetary-gear set wherein coupling or fixing of a sun gear, a carrier, and the like is carried out by engaging or releasing hydraulic friction engaging elements such as a wet multiple-disc clutch, achieving a desired gear. A torque converter or fluid coupling comprising a pump on the input side and a turbine on the output side is interposed between an internal combustion engine and the shift mechanism. The torque converter increases and transmits torque of the engine at vehicle start, and absorbs shock due to transferred torque at shifting, quick acceleration/deceleration, and the like.

A large number of recently commercialized shift mechanisms are of the electronically controlled type wherein solenoid valves for controlling the hydraulic pressure are duty-controlled by an electronic control unit (ECU) to release and engage the friction engaging elements. Typically, the automatic transmission having such shift mechanism carries out shift control in accordance with a shift map having throttle opening and vehicle velocity as parameters. Specifically, a shift command is provided at an instant when the cruising condition corresponds to downshift timing or upshift timing on the shift map, in accordance with which the hydraulic pressure supplied to the engagement-side friction engaging element or the hydraulic pressure discharged from the release-side friction engaging element is controlled to carry out gear change.

In this shift control, an initial value of hydraulic pressure supplied to the engagement-side friction element, i.e. the starting supply pressure, is set in accordance with turbine torque obtained from engine torque. During shifting, the duty ratio of the solenoid valves is feedback-controlled at an optimum value to obtain appropriate hydraulic pressure for prompt close of that shifting.

In this feedback control, a target rate of change of turbine rotational speed is determined in accordance with a previously set shift time and a predicted difference in turbine rotational speed. The hydraulic pressure is increased or decreased so that an actual rate of change of turbine rotational speed determined based on actual measurement approaches the target rate of change. With this, favorable shifting is achieved without having occurrence of simultaneous engagement or release of the engagement-side and release-side friction engaging elements.

In order to stabilize feedback control, JP-A 8-145157 describes a learning correction of the starting supply pressure in accordance with a deviation between the target rate of change of turbine rotational speed at an initial stage of shifting and the actual rate of change of turbine rotational speed which varies with the cruising condition. Moreover, the reference proposes a technique on upshift (power-on upshift) control carried out when an engine output is greater than a predetermined value with an accelerator pedal pressed down by a driver.

Specifically, if the difference in turbine rotational speed increases during upshift where the turbine rotational speed becomes low after shifting, moments of inertial of the turbine and the shift mechanism produce inertia torque which is greatly involved in engagement of the engagement-side friction engaging element. In the technique shown in JP-A 8-145157, considering such inertia torque, the starting supply pressure or initial-stage-engagement pressure is set in accordance with total toque (=turbine torque+inertial torque) acting on the output side of the fluid coupling.

The reference also proposes a technique on upshift control (lift-foot upshift or power-off upshift) carried out when an engine output is smaller than a predetermined value with the accelerator pedal from which the driver removes his/her foot, i.e. when the engine is in the engine-brake state where it is driven by the vehicle or in the coasting state.

Specifically, a basic value of initial-stage-engagement duty ratio is set in accordance with a computed value of turbine torque. During lift-foot upshift, a turbine-torque computed value is equal to roughly zero or a small negative value, so that an initial-stage-engagement duty-ratio basic value is roughly the same regardless of whether the vehicle velocity is high or low. Therefore, an initial-stage-engagement duty ratio is roughly the same regardless of whether the vehicle velocity is high or low.

However, when an initial-stage-engagement duty ratio is roughly the same regardless of whether the vehicle velocity is high or low, a hydraulic actuating member, such as a clutch piston, for engaging the engagement-side friction engaging element such as a wet multiple-disc clutch has different strokes between low and high vehicle velocities. Specifically, at low vehicle velocity, since a difference in rotational speed produced up to synchronization is small in the engagement-side friction engaging element, a time required from supply of the engagement pressure to synchronization is short. On the other hand, at high vehicle velocity, since the rotational-speed difference produced up to synchronization is large, a time required from supply of the engagement pressure to synchronization is long.

When the time required up to synchronization is short, the stroke or movement of the hydraulic actuating member lags behind the synchronizing timing of the engagement-side friction engaging element, such that the engagement-side friction engaging element is engaged after synchronization, i.e. after overshooting synchronization. Such engagement lag leads to an occurrence of drive system shock. On the other hand, when the time required up to synchronization is long, the stroke of the hydraulic actuating member advances with respect to the synchronizing timing of the engagement-side friction engaging element, such that the engagement-side friction engaging element is engaged before synchronization. Such engagement advance also leads to an occurrence of drive system shock, thereby providing a vehicle ejecting feel to the driver.

SUMMARY

An object of the present invention to provide a system and method of controlling an automatic transmission for motor vehicles, which allows, during lift-foot upshift, smooth engagement of the engagement-side friction engaging element in accordance with the vehicle velocity.

The present invention provides generally a system for controlling an automatic transmission for an internal combustion engine, the transmission comprising a gear shift mechanism to which motive force of the engine is transferred through a fluid coupling, the mechanism comprising first and second friction engaging elements, wherein a shifting from a first gear ratio to a second gear ratio is carried out by releasing a first hydraulic pressure of the first friction engaging element for disengagement thereof and supplying a second hydraulic pressure to the second friction engaging element for engagement thereof, the second hydraulic pressure being subjected to a feedback control, wherein the system comprises: a sensor which senses a parameter on a vehicle cruising condition; and an electronic control unit (ECU) which is operative in response to the sensed parameter, the ECU comprising: a part which calculates, in accordance with the sensed parameter, a difference in output-side rotational speed of the fluid coupling before and after the shifting; and a part which sets, when the shifting is carried out with an output of the engine being smaller than a predetermined value, the second hydraulic pressure in accordance with the calculated difference immediately before start of the feedback control.

BRIEF DESCRIPTION OF THE DRAWINGS

The other objects and features of the present invention will become apparent from the following description with reference to the accompanying drawings, wherein.

DETAILED DESCRIPTION OF THE INVENTION0

Figure 1:
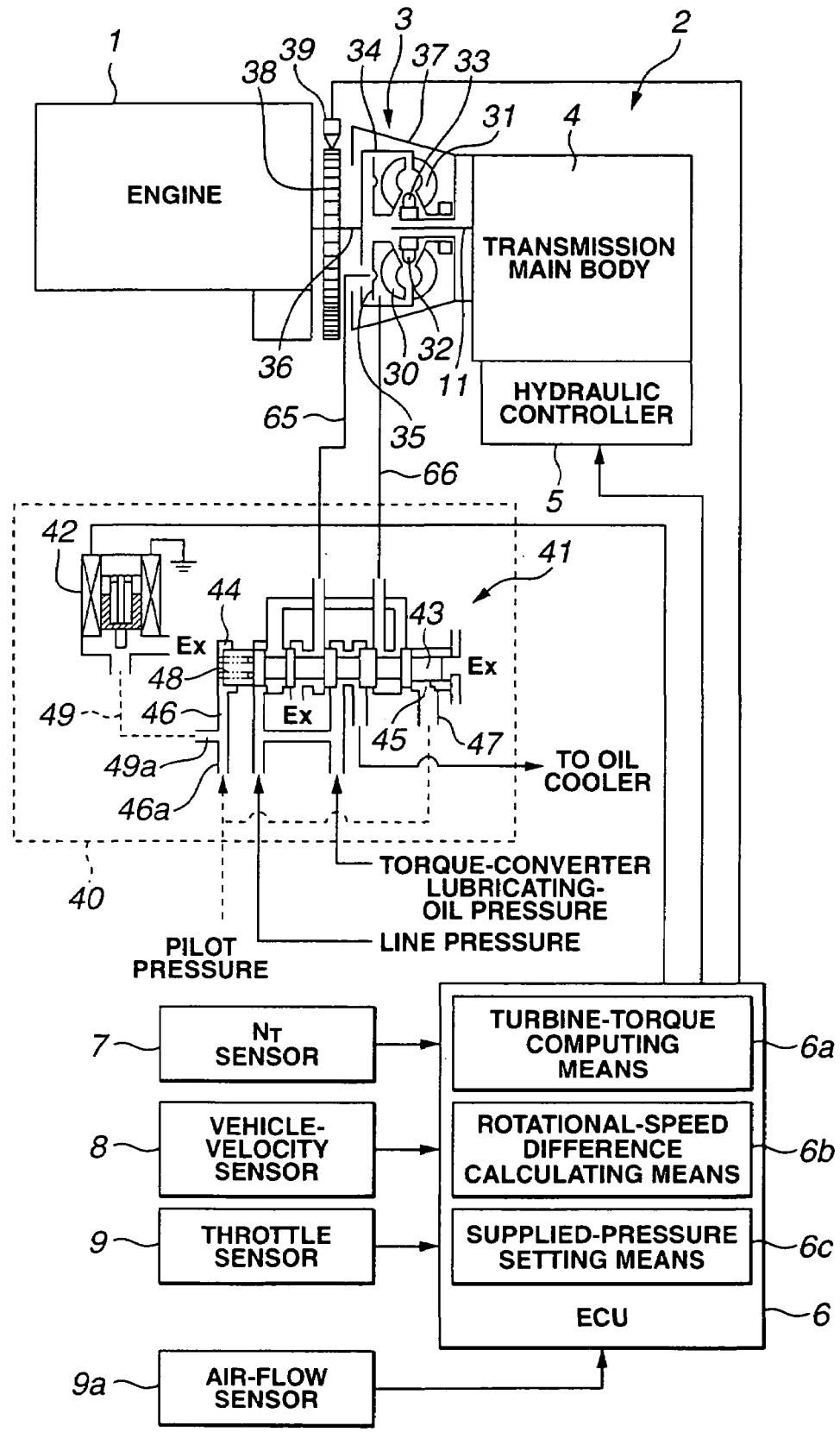
FIG. 1 is a block diagram showing a power plant of a motor vehicle, to which the present invention is applied.
Figure 4:
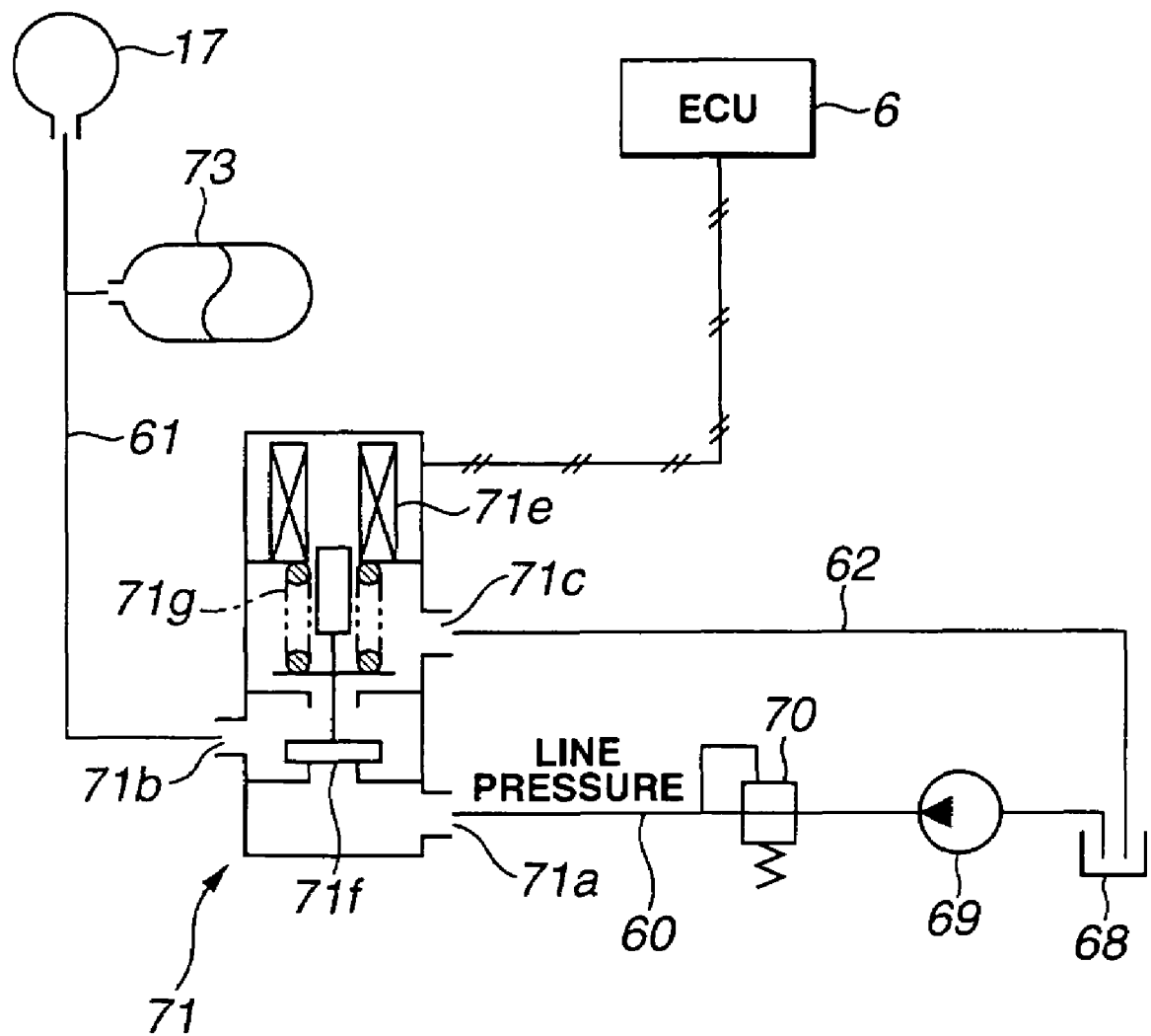
FIG. 4 is a diagram similar to FIG. 1, showing a hydraulic control circuit of a friction engaging element in the gear train.

Referring to FIGS. 1–$11D_3$, a description is made about a shift control system for an automatic transmission for motor vehicles embodying the present invention. Referring to FIG. 1, an automotive power plant comprises an internal combustion engine 1 and an automatic transmission 2 connected at the rear end thereof, wherein motive force of the engine 1 is transferred to driving wheels, not shown, through the transmission 2. The automatic transmission 2 comprises a torque converter 3, a transmission main body 4, and hydraulic controller 5, and is controlled by an electronic control unit (ECU) 6 arranged, for example, in a cabin. The transmission main body 4 incorporates planetary-gear sets and hydraulic friction engaging elements such as a hydraulic clutch and a hydraulic brake. The hydraulic controller 5 incorporates an integrated hydraulic circuit and a plurality of solenoid valves (among which only the second solenoid valve 71 is shown in FIG. 4) duty-driven by the ECU 6. The solenoid valves are provided to respective friction engaging elements as will be described later.

A shift lever, not shown, is mounted to the automatic transmission 2 so as to shift the driving mode. Through driver's operation of the shift lever, the shift range can be selected manually among parking range, drive range including, e.g. first gear to fourth gear, neutral range, and reverse range. The drive range includes two shift modes, i.e. automatic shift mode and manual shift mode. When the automatic shift mode is selected, gear shift is carried out automatically based on a shift map previously set in accordance with the engine speed (turbine rotational speed $N_T$ of a turbine 30 of the torque converter 3, for example) and the engine load (throttle opening $\theta_{TH}$, for example). On the other hand, when the manual shift mode is selected, gear shift is fixed to the selected gear regardless of the shift map, or it is carried out automatically based on the shift map but using its selected-gear area only.

The ECU 6 comprises an input/output device, a storage device incorporating a plurality of control programs such as a nonvolatile RAM and a ROM, a central processing unit (CPU), and a timer counter, not shown. Connected to the input side of the ECU 6 are an $N_T$ sensor 7 for sensing a turbine rotational speed $N_T$ of the turbine 30 of the torque converter 3, a vehicle-velocity sensor 8 for sensing a vehicle velocity V, a throttle sensor 9 for sensing opening $\theta_{TH}$ of a throttle valve, not shown, an air-flow sensor 9a for sensing an intake-air amount of the engine 1, and an electromagnetic-pickup type $N_E$ sensor 39 for sensing an engine speed $N_E$ out of rotation of a ring gear 38 of a flywheel. Connected to the output side of the ECU 6 is a plurality of solenoid valves accommodated in the hydraulic controller 5. Also connected to the ECU 6 are other sensors and switches such as an inhibitor switch for detecting a selected position of the shift range and an idle switch for detecting a closed state of the throttle valve.

The torque converter 3 comprises a fluid coupling including a housing 37, a casing 34, a pump 31, a stator 32, turbine 30, and the like. The pump 31 is coupled through the casing 34 to a driving shaft 36 which serves as an input shaft. The stator 32 is coupled to the housing 37 through a one-way clutch 33. The turbine 30 is coupled to an input shaft 11 of the transmission main body 4, which serves as an output shaft. A wet single-disc damper clutch or lockup clutch 35 is interposed between the casing 34 and the turbine 30 in the torque converter 3. Engagement of the damper clutch 35 allows direct coupling of the driving shaft 36 and the input shaft 11. The damper clutch 35 is driven by hydraulic fluid supplied through hydraulic passages 65, 66 from a damper-clutch pressure control circuit 40 in the hydraulic controller 5.

A damper-clutch control valve 41 which forms a center of the damper-clutch pressure control circuit 40 comprises a spool valve 43 for controlling the hydraulic pressure supplied to the damper clutch 35, left-end and right-end chambers 44, 45 located at left and right ends of the spool valve 43, hydraulic passages 46, 47 for introducing the pilot pressure into the chambers 44, 45, a spring 48 for biasing the spool valve 43 rightward as viewed in FIG. 1, and a normally-closed damper-clutch solenoid valve 42. The hydraulic passage 46 to the left-end chamber 44 is connected to the solenoid valve 42 through a branch passage 49. When the solenoid valve 42 is in the closed position or in the off position, the pilot pressures within the left-end chamber 44 and the right-end chamber 45 are balanced to move rightward as viewed in FIG. 1 the spool valve 43 biased by the spring 48. On the other hand, when the solenoid valve 42 is in the open position or in the on position, the pilot pressure within the left-end chamber 44 is removed, whereas the pilot pressure within the right-end chamber 45 is active, biasing and moving the spool valve 43 leftward as viewed in FIG. 1. The hydraulic passages 46, 49 are formed with orifices 46a, 49a to prevent abrupt variations in pilot pressure.

When the spool valve 43 is moved rightward, the torque-converter lubricating-oil pressure or release pressure is supplied between the casing 34 and the damper clutch 35 through a hydraulic passage 65. Concurrently, hydraulic fluid is discharged from the casing 34 through a hydraulic passage 66, putting the damper clutch 35 in the released state or in the non-direct-coupled state. Thus, rotation of the driving shaft 36 is transferred to the input shaft 11 through rotation of the turbine 30 under the discharge pressure of the pump 31. On the other hand, when the spool valve 43 is moved leftward, hydraulic fluid between the casing 34 and the damper clutch 35 is discharged through the hydraulic passage 65. Concurrently, the apply pressure adjusted by the control valve 41 is supplied into the casing 34 through the hydraulic passage 66, putting the damper clutch 35 in the coupled state or in the full direct-coupled state. Thus, rotation of the driving shaft 36 is directly transferred to the input shaft 11.

In such a way, engagement/disengagement of the damper clutch 35 is determined by the position of the spool valve 43, i.e. a difference in pilot pressure between the left-end and right-end chambers 44, 45. The pressure difference is controlled by duty-driving the solenoid valve 42. By way of example, the ECU 6 drives the solenoid valve 42 at 100% duty ratio, the pilot pressure within the left-end chamber 44 is discharged through the branch passage 49 and the solenoid valve 42 roughly completely to move the spool valve 43 to the left end, putting the damper clutch 35 in the full direct-coupled state by the action of the apply pressure. When the solenoid valve 42 is driven at 0% duty ratio, i.e. it is not driven at all, the pilot pressures within the left-end and the right-end chambers 44, 45 are balanced to move the spool 43 biased by the spring 48, putting the damper clutch 35 in the non-direct-coupled state by the action of the apply pressure. And when the solenoid valve 42 is driven at a predetermined duty ratio, e.g. 25–35% duty ratio, low apply pressure can be created to put the damper clutch 35 in the half-engaged state. The line pressure adjusted by a regulator valve as will be described later serves as inputs of the release pressure and apply pressure which are output pressures of the control valve 41.

Figure 2:
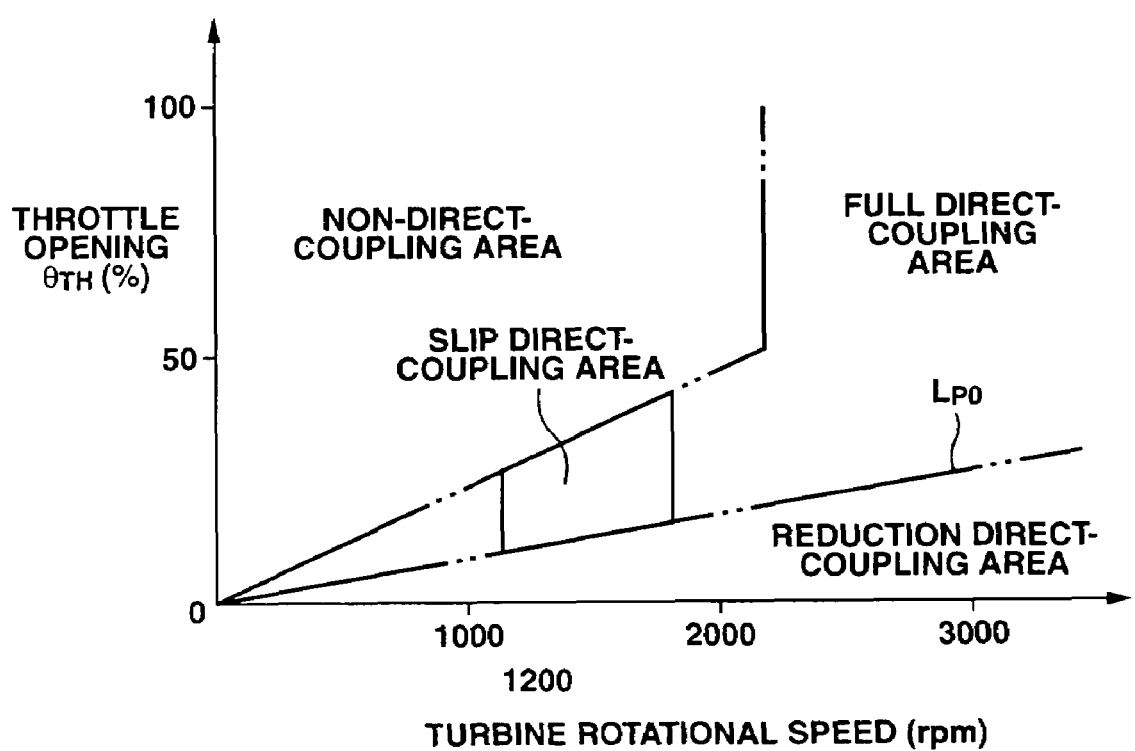
FIG. 2 is a map illustrating a control area of a damper clutch.

Referring to FIG. 2, except during shift control, the ECU 6 carries out drive control of the damper clutch 35 based on a map. In the map, the x-axis indicates turbine rotational speed $N_T$, and the y-axis indicates throttle opening $\theta_{TH}$. As shown in FIG. 2, in the power-on state where the turbine rotational speed $N_T$ is relatively high, and the throttle opening $\theta_{TH}$ is larger than a power-on line $L_{PO}$, almost all area is involved in the full direct-coupling area, wherein the damper clutch 35 undergoes full direct-coupling control. Specifically, as described above, the apply pressure is supplied into the casing 34 from the control valve 41, whereas the release pressure is discharged between the damper clutch 35 and the casing 34, achieving engagement of the damper clutch 35. Note that on the power-on line $L_{PO}$, the engine speed $N_E$ coincides with the turbine rotational speed $N_T$ in theory, having no acceleration, nor deceleration. However, variations in engine output may causes slight acceleration or deceleration in reality.

In the power-off state where the throttle opening $\theta_{TH}$ is smaller than the power-on line $L_{PO}$, an area having the turbine rotational speed $N_T$ slightly higher than an idle rotational speed (1,200 rpm in the embodiment) or more is involved in the deceleration direct-coupling area. In the deceleration direct-coupling area, the damper clutch 35 is supplied with the minimum apply pressure to have the half-engaged state, through which the engine 1 and the transmission main body 4 are directly coupled with a predetermined slip amount. During hard braking and the like, the damper clutch 35 is disengaged quickly to avoid engine stall. During deceleration direct coupling, fuel supply can be stopped while maintaining rotation of the engine 1, leading to great enhancement in fuel consumption.

Figure 3:
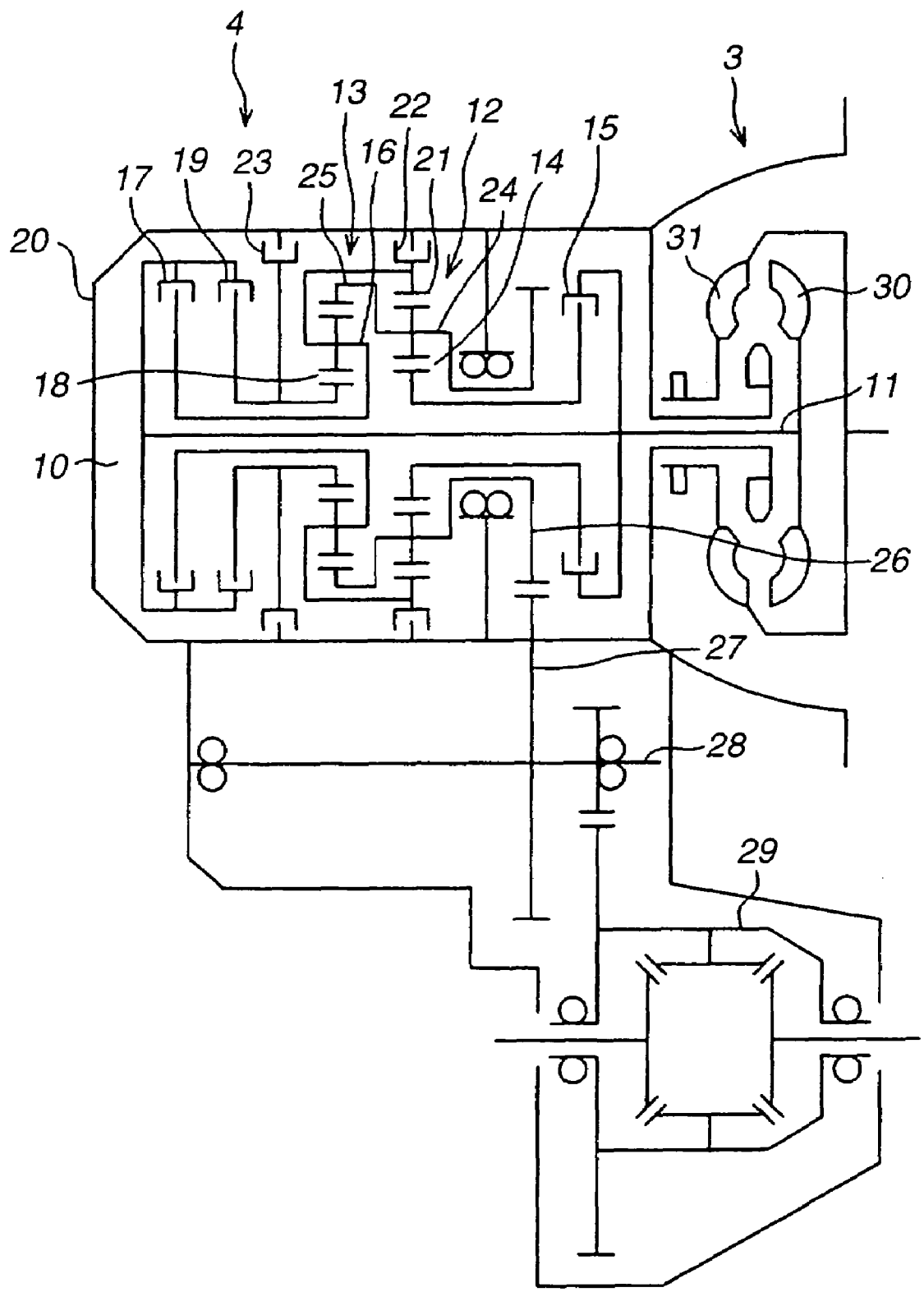
FIG. 3 is a schematic view showing a gear train in a transmission main body in FIG. 1.

Referring to FIG. 3, a gear train is arranged in the transmission main body 4 to allow achievement of four forward gears and one reverse gear. Connected to the turbine 30 is the input shaft 11 on which a shift mechanism 10 is held, comprising first and second planetary-gear sets 12, 13, a first clutch 15 for coupling a sun gear 14 of the first planetary-gear set 12 to the input shaft 11, a second clutch 17 for coupling a pinion carrier 16 of the second planetary-gear set 13 to the input shaft 11, and a third clutch 19 for coupling a sun gear 18 of the second planetary-gear set 13 to the input shaft 11. Fixed to the casing 20 of the transmission main body 4 are an internal gear 21 of the first planetary-gear set 12, a first brake 22 serving as a reaction element, sun gear 18 of the second planetary-gear set 13, and a second brake 23 serving as a reaction element. Rotation of the input shaft 11 is transferred to a countershaft 28 through a pinion carrier 24 of the first planetary-gear set 12, a drive gear 26 coupled to the pinion carrier 24, and a driven gear 27, which is then transferred to a differential carrier 29.

The internal gear 21 of the first planetary-gear set 12 and the pinion carrier 16 of the second planetary-gear set 13, and the pinion carrier 24 of the first planetary-gear set 12 and an internal gear 25 of the second planetary-gear set 13 are coupled to each other for unitary rotation. Referring to FIG. 4, a hydraulic control circuit of the friction engaging elements comprises a second solenoid valve 71 that controls the supply/discharge of the hydraulic pressure to/from the friction engaging element, e.g. second clutch 17. The second solenoid valve 71 includes a normally-open two-position selector valve, having three ports 71a, 71b, 71c.

Connected to the first port 71a is a first hydraulic passage 60 extending from an oil pan 68 to an oil pump 69 for sucking hydraulic fluid and having a regulator valve 70 provided thereto, supplying the hydraulic pressure or line pressure adjusted to a predetermined value to the solenoid valve, the control valve 41, and the like. Connected to the second port 71b is a second hydraulic passage 61 extending to the second clutch 17. And connected to a third port 71c is a third hydraulic passage 62 for discharging hydraulic fluid to the oil pan 68. An accumulator 73 is provided to the second hydraulic passage 61.

The second solenoid valve 71 is electrically connected to the ECU 6, and is duty-controlled in accordance with a drive signal therefrom. When the solenoid 71e is de-energized, a valve element 71f is pressed by a return spring 71g to block fluid communication between the first and second ports 71a, 71b and allow fluid communication between the second and third ports 71b, 71c. On the other hand, when the solenoid 71e is energized, the valve element 71f is lifted up against the return spring 71g to allow fluid communication between the first and second ports 71a, 71b and block fluid communication between the second and third ports 71b, 71c.

When the duty ratio provided by the ECU 6 to the solenoid valve, e.g. the second solenoid valve 17, is 100%, the hydraulic pressure supplied to the friction engaging element, e.g. the second clutch 17, is line pressure adjusted by the regulator valve 70. On the other hand, when the duty ratio is 0%, the valve element 71f blocks fluid communication between the first and second ports 71, 71b through the return spring 71g and allows fluid communication between the second and third ports 71b, 71c, discharging hydraulic fluid from the second clutch 17.

Figure 5:
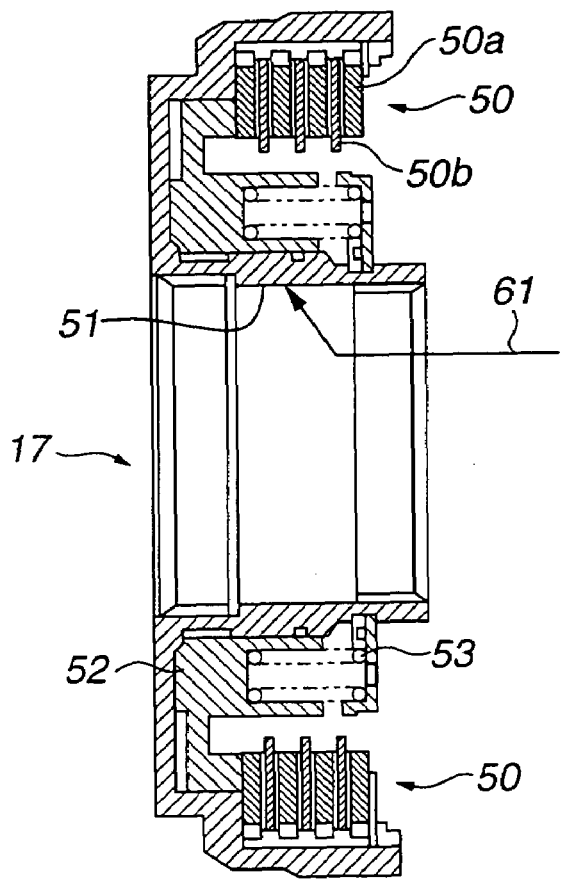
FIG. 5 is a sectional view showing a clutch as a friction engaging element in the gear train.

Referring to FIG. 5, the second clutch 17 comprises a plurality of friction engaging plates 50 each comprising a clutch plate 50a rotating unitarily with the input shaft 11 and a clutch disc 50b rotating unitarily with the pinion carrier 16. During engagement of the second clutch 17, hydraulic fluid as pressure-controlled by the second solenoid valve 71 is supplied to the second clutch 17 through the first hydraulic passage 61 and a port 51 so as to move forward a piston 52, coupling the clutch plate 50a and clutch disc 50b of the friction engaging plate 50. On the other hand, during disengagement of the second clutch 17, the piston 52 is moved backward by the return spring 53 to discharge hydraulic fluid through the port 51, the first hydraulic passage 61, the second solenoid valve 71, and the second hydraulic passage 62, releasing frictional engagement between the clutch plate 50a and the clutch disc 50b.

A sufficient clearance or looseness is defined between the clutch plate 50a and clutch disc 50b of the second clutch 17 to achieve full separation without producing a drag on disengagement. Therefore, on engagement, in order to cancel ineffective stroke by reducing the clearance substantially to zero, clearance eliminating operation is carried out before putting the clutch plate 50a and the clutch disc 50b in engagement.

The first clutch 15, the second brake 23, and the like are substantially the same in structure as the second clutch 17, the description of which is omitted accordingly.

With the automatic transmission 2 comprising transmission main body 4 constructed as described above, when the vehicle cruises with the shift lever selected at the automatic shift mode in the drive range, the friction engaging elements such as the first, second, and third clutches 15, 17, 19 and the first and second brakes 22, 23 are duty-controlled by the respective solenoid valves in accordance with the vehicle velocity V sensed by the vehicle-velocity sensor 7 and the throttle opening θTH sensed by the throttle sensor 8 as described above, automatically achieving any of the gears based on a combination of engagement and disengagement shown in Table 1.

TABLE 1

| Gears | Friction engaging elements | | | | |
|---|---|---|---|---|---|
| | 1st clutch 15 | 2nd clutch 17 | 3rd clutch 19 | 1st brake 22 | 2nd brake 23 |
| First | o | | | o | |
| Second | o | | | | o |
| Third | o | o | | | |
| Fourth | | o | | | o |
| Reverse | | | o | o | |

In Table 1, a cell with circle designates engagement of the clutch or the brake.

During shifting, drive signals having predetermined duty ratios are provided to the solenoid valves of the hydraulic controller 5 in predetermined output patterns, carrying out optimum shift control which provides excellent shift feel. Particularly, in order to appropriately control the engagement-side friction engaging element or second friction engaging element and the like during upshift (lift-foot upshift) with the accelerator pedal from which the driver removes his/her foot, i.e. in the engine-brake or coasting state, the ECU 6 comprises means or part 6a for computing a turbine torque $T_T$, means or part 6b for calculating an output-side rotational-speed difference of the torque converter 3 when upshifting the gear in accordance with the vehicle velocity or a parameter value corresponding thereto, and means or part 6c for setting the hydraulic pressure supplied to the second friction engaging element and the like.

As to the feature of the supplied-pressure setting means 6c, for left-foot upshift, the starting supply pressure to be supplied to the engagement-side friction engaging element is set in accordance with the rotational-speed difference immediately before starting feedback control.

Figure 7:
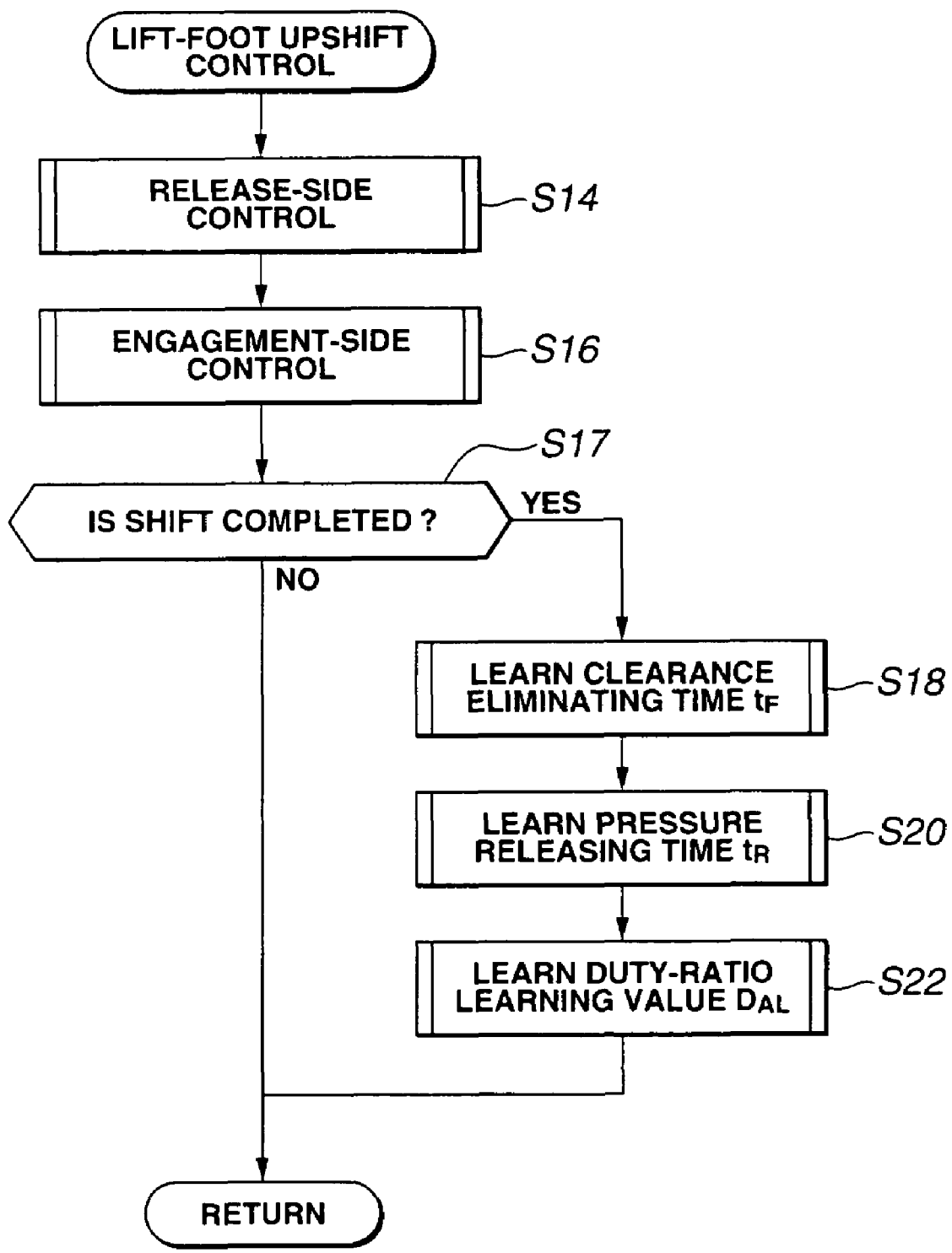
FIG. 7 is a flow chart showing operation of an embodiment.
Figure 8:
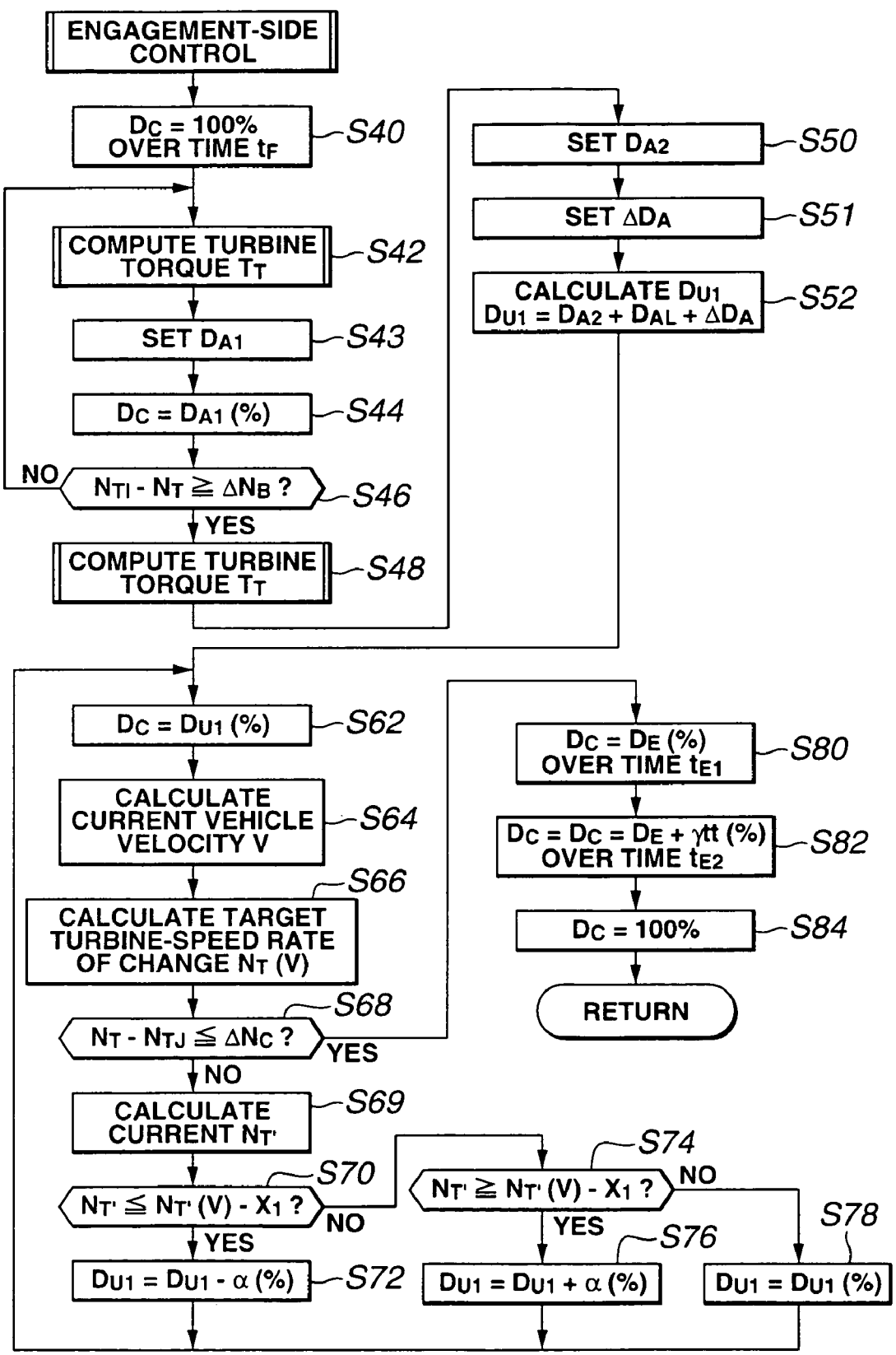
FIG. 8 is chart similar to FIG. 7, showing operation of the embodiment.
Figure 9:
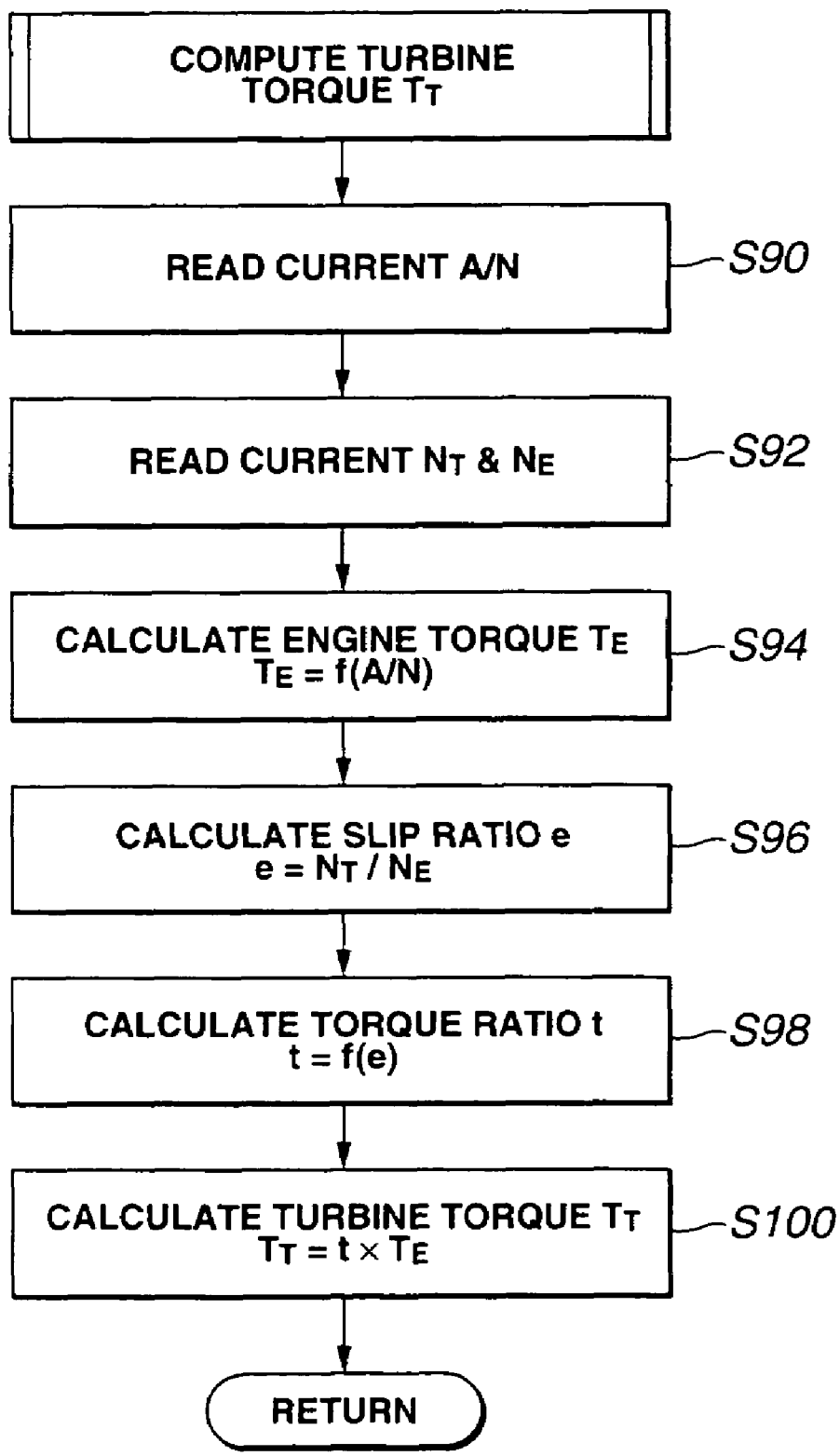
FIG. 9 is a chart similar to FIG. 8, showing operation of the embodiment.

Referring to FIGS. 7–9, a description is made about upshift control executed by the ECU 6 during left-foot upshift. As is seen from Table 1, the engagement-side friction engaging element or second engaging element during upshift corresponds to second brake for 1–2 upshift from the first gear to the second gear, second clutch 17 for 2–3 upshift from the second gear to the third gear, and second brake 23 for 3–4 upshift from the third gear to the fourth gear, whereas the release-side friction engaging element or first engaging element corresponds to first brake 22 for 1–2 upshift, second brake 23 for 2–3 upshift, and first clutch 15 for 3–4 upshift.

Referring to FIG. 7, there is shown a left-foot upshift control routine as main control for left-foot upshift, for example, from the second gear (first shift ratio) to the third gear (second shift ratio). A description is made hereafter taking this 2–3 upshift as an example.

Figure 10A:
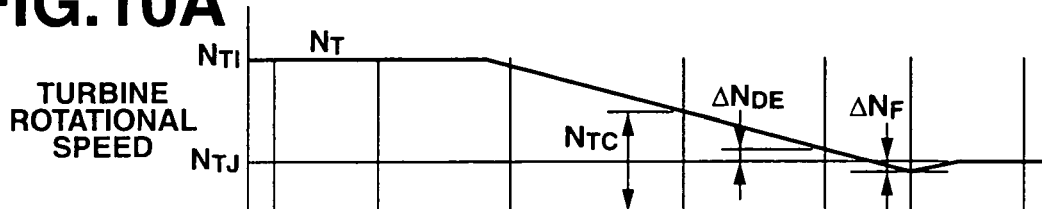
FIGS. 10A–10D are time charts illustrating a temporal change in turbine rotational speed, duty ratio of a release-side solenoid valve, duty ratio of an engagement-side solenoid valve, and hydraulic pressures supplied to the release-side and engagement-side friction engaging elements; and FIGS. $11A_1$–$11D_3$ are time charts illustrating a temporal change in throttle opening, torque, turbine rotational speed, and hydraulic pressures supplied to the engagement-side friction engaging element, wherein FIGS. $11A_1$–$11D_1$ and $11A_2$–$11D_2$ show examples of the related art, and FIGS. $11C_3$ and $11D_3$ show examples of the present invention.
Figure 10B:
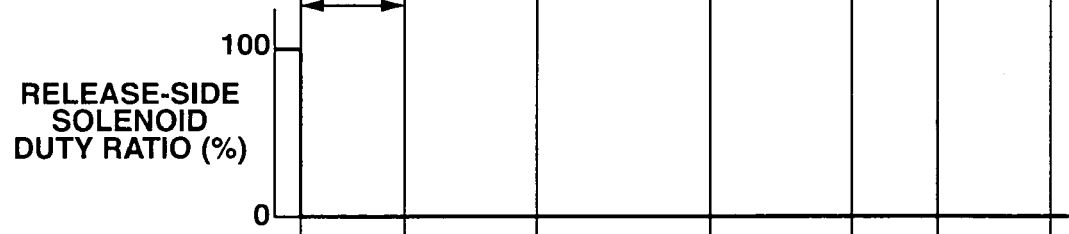

Referring to FIG. 7, at a step S14, release-side control is carried out to control a duty ratio $D_R$ of the friction engaging element. Referring to FIG. 10B, in release-side control, the duty ratio $D_R$ is switched from 100% to 0% when a control starting command is provided, releasing the hydraulic pressure from the second brake 23.

Figure 10C:
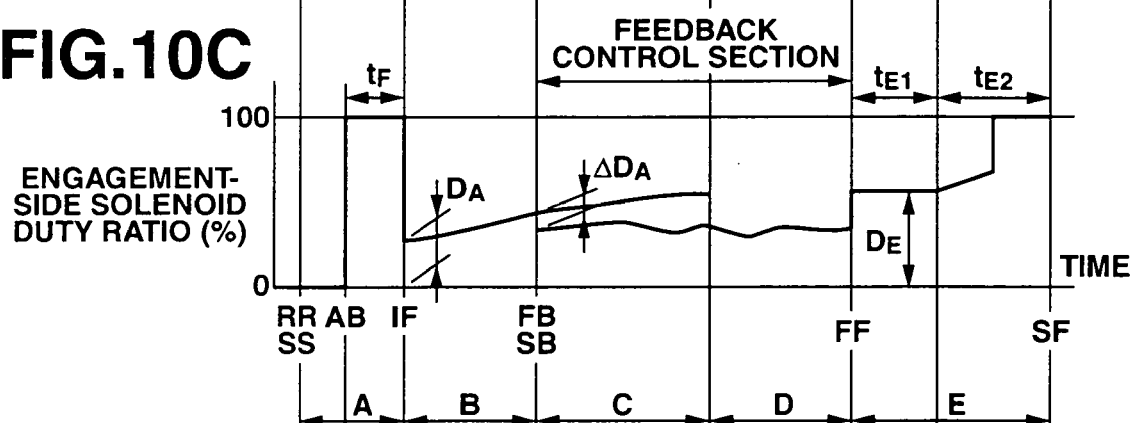
Figure 10D:
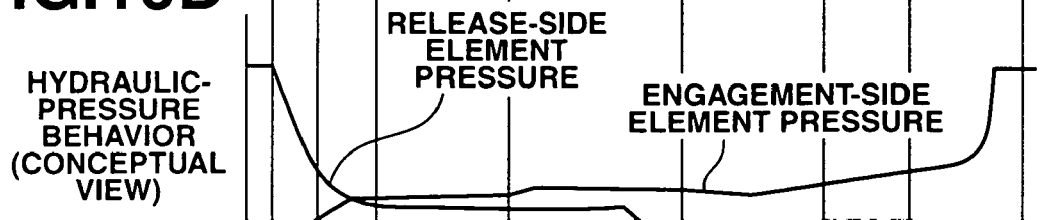

Then, at a step S16, engagement-side control is carried out to control an engagement-side duty ratio $D_R$ of the friction engaging element. Specifically, referring to FIG. 8, when the ECU 6 provides a shift command SS at an instant SS as shown in FIG. 10C, engagement-side control is carried out as follows. At a step S40, in order to eliminate a clearance between the clutch plate 50a and the clutch disc 50b, clearance eliminating operation is carried out during a predetermined time $t_F$ as described above. Since this operation is destined for canceling ineffective stroke of the second clutch 17, a duty ratio $D_C$ of the second clutch 17 is set at 100% to achieve the quickest action thereof as shown in FIG. 10C. Then, the second clutch 17 is supplied with hydraulic fluid with line pressure. With this, referring to FIG. 10D, the engagement-side hydraulic pressure is increased gradually as shown by a curve of the engagement-side element. After a lapse of the clearance eliminating time $t_F$ which is corrected based on learning, flow proceeds to a step S42.

At the step S42, the turbine torque $T_T$ transferred from the engine 1 to the turbine 30 is computed for detection of output torque. Determination of the turbine torque $T_T$ allows setting of the hydraulic pressure to be supplied to the second clutch 17 after a lapse of the clearance eliminating time $t_F$. Computing of the turbine torque $T_T$ is carried out in accordance with a subroutine as shown in FIG. 9.

Referring to FIG. 9, at a step S90, a current A/N (intake air amount per intake stroke) calculated in accordance with input information out of the air-flow sensor 9a is read into the storage device. At a step S92, current turbine rotational speed $N_T$ and engine speed $N_E$ are read into the storage device in accordance with input information out of the $N_T$ sensor 7 and the $N_E$ sensor 39.

At a step S94, the engine torque $T_E$ to be provided by the engine 1 is calculated from the current A/N read at the step S90. The engine torque $T_E$ is given by the following expression as a function of the A/N:

$$T_E = f(A/N) \quad (A1)$$

In the embodiment, the engine torque $T_E$ is obtained using the A/N. Optionally, the engine torque $T_E$ may be obtained using the throttle opening $\theta_{TH}$ sensed by the throttle sensor 9, the engine speed $N_E$, and the like.

At a step S96, a slip ratio "e" is calculated from the current turbine rotational speed $N_T$ and engine speed $N_E$ read at the step S92 and in accordance with the following expression:

$$e = N_T/N_E \quad (A2)$$

Then, at a step S98, a torque ratio "t" between the engine torque $T_E$ and the turbine torque $T_T$ is calculated from the slip ratio "e" and in accordance with the following expression:

$$t = f(e) \quad (A3)$$

Finally, at a step S100, the turbine torque $T_T$ is calculated from the torque ratio "t" and the engine torque $T_E$ and in accordance with the following expression:

$$T_T \times T_E \quad (A4)$$

After obtaining the turbine torque $T_T$ in such a way, flow proceeds to a step S43 shown in FIG. 8.

At the step S43, the duty ratio $D_C$ to be provided to the second solenoid valve 71 of the second clutch 17 after a lapse of the clearance eliminating time $t_F$ is set at an initial duty ratio $D_{A1}$. The initial duty ratio $D_{A1}$ is set in accordance with a map, not shown, illustrating the relationship between the turbine torque $T_T$ and the initial duty ratio $D_{A1}$ and obtained by experiment and the like and stored previously in the ECU 6. After the initial duty ratio $D_{A1}$ is set based on the map in accordance with the turbine torque $T_T$, flow proceeds to a step S44.

At the step S44, the duty ratio $D_C$ to be provided to the second clutch 17 is set at the initial duty ratio $D_{A1}$ obtained as described above. With this, the second clutch 17 is supplied with the hydraulic pressure in accordance with the turbine torque $T_T$, i.e. the hydraulic pressure sufficient for promptly reducing the difference in rotational speed between the clutch plate 50a and clutch disc 50b of the second clutch 17. When starting engagement between the clutch plate 50a and the clutch disc 50b, and a reduction in rotational-speed difference therebetween, the rotational speed $N_T$ of the turbine 30 starts to reduce from a synchronous rotational speed $N_{TI}$ at the second gear to a synchronous rotational speed $N_{TJ}$ at the third gear.

At a step S46, it is determined whether or not a deviation $(N_{TI}-N_T)$ between the turbine rotational speed $N_T$ which starts to reduce and the synchronous rotational speed $N_{TI}$ at the second gear is equal to or greater than a predetermined value $\Delta N_B$, e.g. 50 rpm. If the answer is NO, i.e. it is determined that the deviation $(N_{TI}-N_T)$ is smaller than predetermined value $\Delta N_B$, flow returns to the step S42 to compute the turbine torque $T_T$, then proceeds through the step S43 to the step S44 so as to continuously maintain the duty ratio $D_C$ at the duty ratio $D_{A1}$.

On the other hand, at the step S46, if the answer is YES, i.e. it is determined that the deviation $(N_{TI}-N_T)$ is equal to or greater than predetermined value $\Delta N_B$, flow proceeds to a step S48. Referring to FIG. 10C, suppose, for convenience sake, that an instant when the deviation $(N_{TI}-N_T)$ reaches predetermined value $\Delta N_B$ is an instant SB. Steps S48–S52 form a preparation stage for carrying out feedback control. First, at the step S48, the turbine torque $T_T$ is computed again in the same way as at the step S42, then flow proceeds to the step S50.

Figure 6:
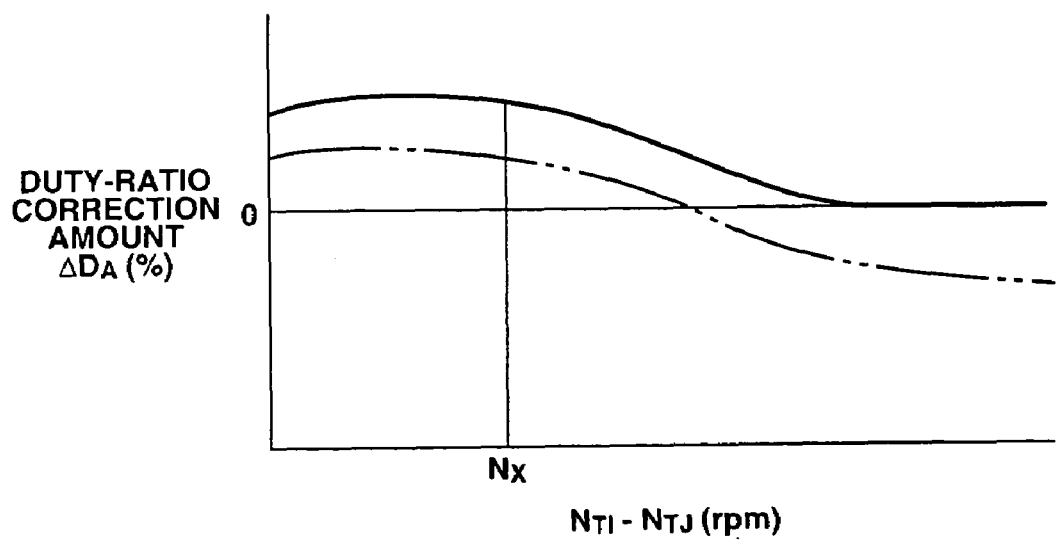
FIG. 6 is a map similar to FIG. 2, explaining characteristics of correction of the staring supply pressure provided to a second friction engaging element.

At the step S50, a reference duty ratio $D_{A2}$ at start of feedback control is set based on a map, not shown, illustrating the relationship between the turbine torque $T_T$ and the reference duty ratio $D_{A2}$ and obtained by experiment and the like and stored previously in the ECU 6. After the reference duty ratio $D_{A2}$ is set based on the map, flow proceeds to the step S51 where a duty-ratio correction amount $\Delta D_A$ is set in accordance with a rotational-speed difference $(N_T-N_{TJ})$ between the turbine rotational speed $N_T$ at shift start and the synchronous rotational speed $N_{TJ}$ at the third gear after shifting. Referring to FIG. 6, the duty-ratio correction amount $\Delta D_A$ is set based on a map in accordance with either a curve shown by solid line or a curve shown by two-dot chain line.

As shown by the solid-line curve or the two-dot chain-line curve in FIG. 6, the duty-ratio correction amount $\Delta D_A$ is greater in the area having smaller rotational-speed difference $(N_T-N_{TJ})$. After the rotational-speed difference $(N_T-N_{TJ})$ exceeds a predetermined value $N_X$, it is smaller as the rotational-speed difference is greater. This is because there is a tendency that engagement of the friction engaging element requires much time as the vehicle velocity is higher, i.e. the rotational-speed difference $(N_T-N_{TJ})$ is greater, conversely, engagement of the friction engaging element requires less time as the vehicle velocity is lower, i.e. the rotational-speed difference $(N_T-N_{TJ})$ is smaller.

The duty-ratio correction amount $\Delta D_A$ is added to the reference duty ratio $D_{A2}$ as will be described later. In accordance with determination of the reference duty ratio $D_{A2}$, the correction amount $\Delta D_A$ can be set to have always a value greater than zero (refer to the solid-line curve in FIG. 6) or may have a negative value (refer to the two-dot chain-line curve in FIG. 6). After setting the correction amount $\Delta D_A$, flow proceeds to the step S52.

At the step S52, a feedback-control duty ratio $D_{U1}$ involved in the starting supply pressure is calculated from the reference duty ratio $D_{A2}$, a duty-ratio learning value $D_{AL}$, and the duty-ratio correction amount $\Delta D_A$ in accordance with the following expression:

$$D_{U1} = D_{A2} + D_{AL} + \Delta D_A \quad (B1)$$

where the duty-ratio learning value $D_{AL}$ is a value for correcting the reference duty ratio $D_{A2}$ at start of feedback control to an appropriate value and corrected based on learning as will be described later.

A step S62 and subsequent are destined for carrying out feedback control. First, at the step S62, the duty ratio $D_C$ of the second clutch 17 is newly set at the feedback-control duty ratio $D_{U1}$. At a step S64, current vehicle velocity V is calculated in accordance with an input signal out of the vehicle-velocity sensor 8. At a step S66, it is calculated a target rate of change $N_T'$ (V) of the turbine rotational speed $N_T$. The target turbine-speed rate of change $N_T'$ (V) is given by a linear function of the vehicle velocity V. The relationship between the target turbine-speed rate of change $N_T'$ (V) and the vehicle velocity V is set by experiment and the like so that shifting is completed in a shift time $T_{SFT}$, e.g. 0.7 sec, and it is previously stored as a map in the ECU 6. Then, the target turbine-speed rate of change $N_T'$ (V) corresponding to the current vehicle velocity V is read from the map. During upshift, the target turbine-speed rate of change $N_T'$ (V) is given by a negative value, which is increased in the negative direction as the vehicle velocity V is higher, providing larger variation gradient.

A subsequent step S68 is destined for determining whether or not shifting approaches a close, where it is determined whether or not the difference ($N_T-N_{TJ}$) between the turbine rotational speed $N_T$ and the synchronous rotational speed $N_{TJ}$ at the third gear after shifting is equal to or smaller than a predetermined value $\Delta N_C$. If the answer is NO, it can be determined that shifting does not approach a close, then flow proceeds to a step S69.

At the step S69, a current turbine-speed rate of change $N_T'$ is calculated in accordance with a measured value of the turbine rotational speed $N_T$. At a step S70, it is determined whether or not the current turbine-speed rate of change $N_T'$ is equal to or smaller than the range of a negative-side predetermined permissible value $X_1$ (3REV/s$^2$, for example) of the target turbine-speed rate of change $N_T'$ (V) obtained at the step S66. If the answer is YES, i.e. it is determined that the current turbine-speed rate of change $N_T'$ is equal to or smaller than the range of predetermined permissible value $X_1$, it can be determined that the hydraulic pressure to be supplied to the second clutch 17 is higher to make the development of engagement too quick. Then, flow proceeds to a step S72 where the feedback-control duty ratio $D_{U1}$ is decreased by a predetermined correction value $\alpha$ ($D_{U1}=D_{U1}-\alpha$). With this, the hydraulic pressure to be supplied to the second clutch 17 is reduced, so that the current turbine-speed rate of change $N_T'$ approaches the target turbine-speed rate of change $N_T'$ (V). On the other hand, at the step S70, if the answer is NO, i.e. it is determined that the current turbine-speed rate of change $N_T'$ is greater than the range of predetermined permissible value $X_1$, flow proceeds to a step S74.

At the step S74, it is determined whether or not the current turbine-speed rate of change $N_T'$ is equal to or greater than the range of a positive-side predetermined permissible value $X_1$ (3REV/s$^2$, for example) of the target turbine-speed rate of change $N_T'$ (V). If the answer is YES, i.e. it is determined that the current turbine-speed rate of change $N_T'$ is equal to or greater than the range of predetermined permissible value $X_1$, it can be determined that the hydraulic pressure to be supplied to the second clutch 17 is lower to make the development of engagement slow. Then, flow proceeds to a step S76 where the feedback-control duty ratio $D_{U1}$ is increased by predetermined correction value $\alpha$ ($D_{U1}=D_{U1}+\alpha$). On the other hand, at the step S74, if the answer is NO, i.e. it is determined that the current turbine-speed rate of change $N_T'$ is smaller than the range of predetermined permissible value $X_1$, flow proceeds to a step S78.

At the step S78, no correction is carried out about feedback-control duty ratio $D_{U1}$, since it can be determined, based on the results of determination at the steps S70 and S74, that the current turbine-speed rate of change $N_T'$ is within the range of negative-side and positive-side predetermined permissible values $X_1$, and thus has a value roughly equal to the target turbine-speed rate of change $N_T'$ (V). After executing the step S72 and the step S76 or S78, flow returns to the step S62 to newly set the duty ratio $D_C$ at the feedback-control duty ratio $D_{U1}$ as corrected. This new setting of the feedback-control duty ratio $D_{U1}$ is repeatedly carried out so long as the answer at the step S68 is NO, i.e. the difference ($N_T-N_{TJ}$) between the turbine rotational speed $N_T$ and the synchronous rotational speed $N_{TJ}$ at the third gear after shifting is greater than predetermined value $\Delta N_C$, which provides feedback accordingly.

With feedback control developed, if the answer at the step S68 is YES, i.e. it is determined that the difference ($N_T-N_{TJ}$) between the turbine rotational speed $N_T$ and the synchronous rotational speed $N_{TJ}$ at the third gear after shifting is equal to or smaller than predetermined value $\Delta N_C$, It can be determined that shifting approaches a close. Then, flow proceeds to a step S80. Referring to FIG. 10C, suppose that an instant when the rotational-speed difference ($N_T-N_{TJ}$) is equal to or smaller than predetermined value $\Delta N_C$ is an instant FF.

At the step S80, the duty ratio $D_C$ of the second clutch 17 is set at a duty ratio $D_E$ over a predetermined time $t_{E1}$. The duty ratio $D_E$ is higher than the feedback-control duty ratio $D_{U1}$ by an appropriate value. After a lapse of predetermined time $t_{E1}$, flow proceeds to a step S82 where the duty ratio $D_C$ of the second clutch 17 is increased at a predetermined gradient $\gamma$ over a predetermined time $t_{E2}$ as given by the following expression:

$$D_C=D_E+\gamma \cdot tt \quad (B2)$$

where tt indicates an elapsed time with respect to an instant after a lapse of predetermined time $t_{E1}$ from the instant FF. After a lapse of predetermined time $t_{E2}$, flow proceeds to a step S84 where the duty ratio $D_C$ is set at 100%.

As described above, immediately before a close of shifting, the duty ratio $D_C$ of the second clutch 17 is set at the duty ratio $D_E$ over predetermined time $t_{E1}$, the duty ratio $D_E$ being higher than the feedback-control duty ratio $D_{U1}$ by an appropriate value (step S80). Subsequently, the duty ratio $D_c$ is increased at predetermined gradient $\gamma$ (step S82), then set at 100% (step S84). Such operation allows a reduction in shift shock which may occur when setting the duty ratio $D_C$ at 100%.

And at an instant of close of shifting (instant SF), the second clutch 17 is in full engagement, completing a series of control operations for 2–3 upshift. As described above, engagement-side control is carried out with feedback control of the duty ratio $D_C$, so that even when the current turbine-speed rate of change $N_T'$ under continuous control is deviated from the target turbine-speed rate of change $N_T'$ (V), the feedback-control duty ratio $D_{U1}$ for determining the duty ratio $D_C$ is corrected to appropriately increase or decrease the hydraulic pressure to be supplied to the second clutch 17, achieving excellent and quick shifting.

Referring to FIG. 7, after execution of engagement-side control, flow returns to the left-foot upshift control routine so as to proceed to a step S17. At the step S17, it is determined whether or not upshift is completed, i.e. the turbine rotational speed $N_T$ reaches the synchronous rotational speed $N_{TJ}$ at the third gear. If the answer is NO, i.e. it is determined that upshift is not completed, release-side and engagement-side controls are carried out continuously. On the other hand, if the answer is YES, i.e. it is determined that upshift is completed, flow proceeds to a step S18.

Steps S18–S22 are destined for carrying out various learning operations, i.e. learning on clearance eliminating time $t_F$, hydraulic-pressure releasing time $t_R$, and duty-ratio learning value $D_{AL}$. Learning on clearance eliminating time $t_F$, hydraulic-pressure releasing time $t_R$, and duty-ratio learning value $D_{AL}$ can be made by using an earlier technique shown, for example, in JP-A 8-145157, the description of which is omitted accordingly. After execution of learning, a series of control operations for 2–3 upshift is completed.

With the above structure, in the illustrative embodiment of engagement-side control during lift-foot upshift, the duty ratio $D_C$ to be provided to the engagement-side friction engaging element or the second friction engaging element is corrected using the duty-ratio correction amount $\Delta D$ in accordance with the rotation-speed difference $(N_T-N_{TJ})$ before setting. Thus, timing of engaging the second friction engaging element can be set optimally in accordance with the rotation-speed difference $(N_T-N_{TJ})$, i.e. the vehicle velocity.

Specifically, for upshift (lift-foot upshift) with output torque being smaller than a predetermined value, the rotation-speed difference $(N_T-N_{TJ})$ before and after shifting varies with the vehicle velocity, with which optimum timing of engaging the friction engaging element varies in turn. On the other hand, in the illustrative embodiment, since supplied-pressure setting means correct the duty ratio $D_C$ using the duty-ratio correction amount $\Delta D$ before setting, timing of engaging the second friction engaging element can be set optimally in accordance with the vehicle velocity, restraining occurrence of shock of the drive system when engagement timing is too advanced as well as occurrence of shock of the drive system and vehicle ejecting feel when engagement timing is too lagged.

By way of example, referring to FIGS. $11A_1-11D_1$ and $11A_2-11D_2$, there is shown a temporal change in parameters during lift-foot upshift at low vehicle velocity and high vehicle velocity in the case where the present invention is not applied. Referring to FIGS. $11D_1$ and $11D_2$, the initial pressure is built up in conformity with synchronous timing at high vehicle velocity, providing too low initial engagement pressure at low vehicle velocity. Thus, engagement of the second friction engaging element starts after synchronous timing as shown in FIG. $C_1$, causing torque shock. On the other hand, in the illustrative embodiment, referring to FIGS. $11C_3$ and $11D_3$, the duty ratio $D_C$ is increased using the duty-ratio correction amount $\Delta D$ before setting (refer to FIG. $11D_3$), providing appropriately increased initial engagement pressure at low vehicle velocity. Thus, engagement of the second friction engaging element starts in conformity with synchronous timing as shown in FIG. $C_3$, achieving smooth shifting without causing torque shock.

Having described the present invention in connection with the illustrative embodiment, it is to be noted that the present invention is not limited thereto, and various changes and modifications can be made without departing from the scope of the present invention. By way of example, in the illustrative embodiment, the present invention is described in connection with 2–3 upshift. It is needless to say that the present invention is effective on 1–2 upshift, 3–4 upshift, and the like.

Moreover, in the illustrative embodiment, the present invention is applied to the automatic transmission which allows achievement of four forward gears. Optionally, the present invention can be applied to an automatic transmission having at least two forward gears.

The entire teachings of Japanese Patent Application P2003-032810 filed Feb. 10, 2003 are incorporated hereby by reference.

What is claimed is:

1. A system for controlling an automatic transmission for an internal combustion engine, the transmission comprising a gear shift mechanism to which motive force of the engine is transferred through a fluid coupling, the mechanism comprising first and second friction engaging elements, wherein a shifting from a first gear ratio to a second gear ratio is carried out by releasing a first hydraulic pressure of the first friction engaging element for disengagement thereof and supplying a second hydraulic pressure to the second friction engaging element for engagement thereof, the second hydraulic pressure being subjected to a feedback control, the system comprising:
   a sensor that senses a parameter on a vehicle cruising condition; and
   an electronic control unit (ECU) that is operative in response to the sensed parameter, the ECU comprising:
      a first part that calculates, in accordance with the sensed parameter, a difference in output-side rotational speed of the fluid coupling before and after the shifting; and
      a second part that sets, when the shifting is carried out with an output of the engine being smaller than a predetermined value, the second hydraulic pressure immediately before start of the feedback control in accordance with the calculated difference,
   wherein the second hydraulic pressure has an initial value that is determined in accordance with torque acting on the output side of the fluid coupling immediately before start of the feedback control,
   wherein the initial value is corrected in accordance with the calculated difference in output-side rotational speed, and
   wherein the corrected initial value of the second hydraulic pressure decreases with an increase in the calculated difference in output-side rotational speed.

2. The system as claimed in claim 1, wherein the parameter of the sensor comprises a vehicle velocity.

3. The system as claimed in claim 1, wherein the corrected initial value of the second hydraulic pressure is held substantially constant in an area where the calculated difference in output-side rotational speed is smaller than a predetermined value, whereas the corrected initial value is decreased with increasing the calculated difference in an area where the calculated difference is greater than the predetermined value.

4. The system as claimed in claim 1, wherein the ECU comprises a map set previously for correction of the initial value of the second hydraulic pressure.

5. An automatic transmission for an internal combustion engine, comprising:
   a fluid coupling;
   a gear shift mechanism to which motive force of the engine is transferred through the fluid coupling, the mechanism comprising first and second friction engaging elements, wherein a shifting from a first gear ratio to a second gear ratio is carried out by releasing a first hydraulic pressure of the first friction engaging element for disengagement thereof and supplying a second hydraulic pressure to the second friction engaging element for engagement thereof, the second hydraulic pressure being subjected to a feedback control;
   a sensor that senses a parameter on a vehicle cruising condition; and an electronic control unit (ECU) that is operative in response to the sensed parameter. the ECU being programmed to:
calculate, in accordance with the sensed parameter, a difference in output-side rotational speed of the fluid coupling before and after the shifting: and
set, when the shifting is carried out with an output of the engine being smaller than a predetermined value, the second hydraulic pressure immediately before a start of the feedback control in accordance with the calculated difference,
wherein the second hydraulic pressure has an initial value that is determined in accordance with torque acting on the output side of the fluid coupling immediately before the start of the feedback control,
wherein the initial value is corrected in accordance with the calculated difference in output-side rotational speed, and
wherein the corrected initial value of the second hydraulic pressure decreases with an increase in the calculated difference in output-side rotational speed.

6. The automatic transmission as claimed in claim 5, wherein the parameter of the sensor comprises a vehicle velocity.

7. The automatic transmission as claimed in claim 5, wherein the corrected initial value of the second hydraulic pressure is held substantially constant in an area where the calculated difference in output-side rotational speed is smaller than a predetermined value, whereas the corrected initial value is decreased with increasing the calculated difference in an area where the calculated difference is greater than the predetermined value.

8. The automatic transmission as claimed in claim 5, wherein the ECU comprises a map set previously for correction of the initial value of the second hydraulic pressure.

9. A method of controlling an automatic transmission for an internal combustion engine, the transmission comprising a gear shift mechanism to which motive force of the engine is transferred through a fluid coupling, the mechanism comprising first and second friction engaging elements, wherein a shifting from a first gear ratio to a second gear ratio is carried out by releasing a first hydraulic pressure of the first friction engaging element for disengagement thereof and supplying a second hydraulic pressure to the second friction engaging element for engagement thereof, the second hydraulic pressure being subjected to a feedback control, the method comprising the steps of:
sensing a parameter on a vehicle cruising condition;
calculating, in accordance with the sensed parameter, a difference in output-side rotational speed of the fluid coupling before and after the shifting; and
setting, when the shifting is carried out with an output of the engine being smaller than a predetermined value, the second hydraulic pressure immediately before a start of the feedback control in accordance with the calculated difference,
wherein the second hydraulic pressure has an initial value determined in accordance with torque acting on the output side of the fluid coupling immediately before the start of the feedback control,
wherein the initial value is corrected in accordance with the calculated difference in output-side rotational speed, and
wherein the corrected initial value of the second hydraulic pressure decreases with an increase the calculated difference in output-side rotational speed.

10. The method as claimed in claim 9, wherein the parameter of the sensor comprises a vehicle velocity.

11. The method as claimed in claim 9, wherein the corrected initial value of the second hydraulic pressure is held substantially constant in an area where the calculated difference in output-side rotational speed is smaller than a predetermined value, whereas the corrected initial value is decreased with increasing the calculated difference in an area where the calculated difference is greater than the predetermined value.

12. The method as claimed in claim 9, wherein there is provided a map set previously for correction of the initial value of the second hydraulic pressure.

* * * * *